(12) United States Patent
Roman et al.

(10) Patent No.: US 8,868,651 B2
(45) Date of Patent: Oct. 21, 2014

(54) WEB COMMUNITY PRE-POPULATION METHOD AND SYSTEM

(75) Inventors: Jonathan Roman, Rockville Centre, NY (US); Cathleen Irving, Long Grove, IL (US)

(73) Assignee: Avon Products, Inc., New York, NY (US)

( * ) Notice: Subject to any disclaimer, the term of this patent is extended or adjusted under 35 U.S.C. 154(b) by 226 days.

(21) Appl. No.: 12/857,064

(22) Filed: Aug. 16, 2010

(65) Prior Publication Data

US 2012/0042013 A1 Feb. 16, 2012

(51) Int. Cl.
G06F 15/16 (2006.01)
G06Q 10/10 (2012.01)

(52) U.S. Cl.
CPC .................................. *G06Q 10/10* (2013.01)
USPC .......................................... 709/204; 709/224

(58) Field of Classification Search
CPC ............................... H01L 67/306; G06Q 10/10
USPC .......................................................... 709/224
See application file for complete search history.

(56) References Cited

U.S. PATENT DOCUMENTS

| 7,069,300 B2 | 6/2006 | Toyota et al. |
| 7,467,142 B2 | 12/2008 | Sinn et al. |
| 2004/0010519 A1* | 1/2004 | Sinn et al. ................... 707/200 |
| 2007/0124460 A1* | 5/2007 | McMullen et al. ........... 709/224 |
| 2009/0204599 A1* | 8/2009 | Morris et al. ..................... 707/5 |
| 2009/0234840 A1 | 9/2009 | Chatani |
| 2011/0112866 A1* | 5/2011 | Gerrans ............................. 705/3 |
| 2011/0225293 A1* | 9/2011 | Rathod ......................... 709/224 |
| 2011/0276396 A1* | 11/2011 | Rathod ...................... 705/14.49 |
| 2011/0276632 A1* | 11/2011 | Anderson et al. ............. 709/205 |
| 2012/0028718 A1* | 2/2012 | Barclay et al. ................. 463/42 |
| 2013/0080526 A1* | 3/2013 | Gill et al. ...................... 709/204 |

FOREIGN PATENT DOCUMENTS

| JP | 2002245212 A | 8/2002 |
| JP | 2003281069 A | 10/2003 |
| JP | 2006085705 A | 3/2006 |
| JP | 2008226144 A | 9/2008 |
| JP | 2008310383 A | 12/2008 |
| WO | 2011/032168 A1 | 3/2011 |

* cited by examiner

*Primary Examiner* — Tauqir Hussain
(74) *Attorney, Agent, or Firm* — David M. Joyal; Joan M. McGillycuddy

(57) ABSTRACT

Populating users of a web community into groups. The users may be assigned to, or otherwise associated with, one or more groups in response to an event associated with the user, with another user, with a group, or other type of event. The users may also be removed from a group in response to an event. The population of users into groups can be controlled by a configurable set of rules. These rules can include criteria for associating a user with, or removing a user from, a group in response to an event. The criteria can include criteria based on user information and criteria based on group information. The users may be related to one another in a hierarchical structure.

13 Claims, 8 Drawing Sheets

WEB COMMUNITY PRE-POPULATION METHOD AND SYSTEM

TECHNICAL FIELD

The present disclosure relates generally to distributed network-based communities, and more particularly to methods and systems for pre-populating users into groups within the community.

BACKGROUND

Distributed network-based communities, or "web communities," such as social networking websites and Internet forums, have been increasingly common since the advent of the Internet. Web communities generally provide various platforms for users to communicate. For example, some conventional social networking websites enable users to communicate by way of instant messaging, electronic mail (e-mail), and by posting messages to virtual walls or message boards associated with a user or a group.

Typically, users provide profile information to the provider of the web community, such as their name, address, contact information, hobbies, or job-related information. This profile information can be used by other users to make a connection with another user. For example, a user can search for a specific user by initiating a query based on a name or e-mail address associated with the specific user. In another example, a user may browse other users based on an interest or hobby of the user. The user can then make a connection or request a connection with other users of interest. This connection defines an association between two users and can be used to determine access to certain information or content associated with the users.

Also, some conventional web communities may group their members. A web community group enables users sharing a common interest to communicate and share content with one another. For example, a web community group may include a virtual wall for members to post messages for other members to read. A user can initiate a group and invite other users to join. An invited user can then decide whether to accept or decline the invitation. If the invited user accepts, then that user becomes a member of the group. Additionally, a user may search or browse for groups and request (or directly) join one or more groups of interest. Web community groups can be useful for organizations to promote communication between target groups of people within the organization. For example, a corporation having a hierarchical structure may benefit from web community groups by providing groups for various departments or teams within the corporation.

Maintaining and updating group membership in a web community can be burdensome, especially for large or dynamic communities. Each time a user transitions from one role to another, an administrator of the web community would have to update the group membership information for that user and the membership information for the groups affected by the transition. This process may require modifications to multiple databases each time a user makes a transition. What is needed are systems and methods for automatically populating users into web community groups.

SUMMARY

The invention provides systems and methods for automatically populating users into groups of a web community. A user may be automatically populated into a computer-based group in response to an event associated with the user, with another user, with a group, or other type of event. For example, a user may be assigned to or otherwise associated with a group when the user becomes a member of the web community or when profile information for the user changes. In another example, one or more members of a first group may be automatically reallocated to a second group in response to terminating the first group or a change in the first group.

Users may be populated into groups based on a set of rules embodied in computer software operating on a computer system. The rules may be configured (e.g., by an administrator) to associate a user with a web community group based on an event. The rules can include a variety of criteria for identifying an appropriate group for the user in response to the event. A rules engine can apply the set of rules to information associated with the users to determine which, if any, groups the users should be assigned to. The users meeting the criteria for a group can be assigned to that group. This membership assignment can be stored in a profile of the user and a profile for the group.

An aspect of the present invention provides a method for computer-implemented method for populating a web community group of a web community. This method can include a computer system monitoring for an event. In response to detecting the event, the computer system can apply a rule including membership criteria for the web community group to a user profile for each user of the web community. Each user profile can include information associated with the corresponding user. The computer system can associate each user whose profile meets the membership criteria for the web community group with the web community group. The computer system can store the associations in at least one data storage store.

Another aspect of the present invention provides a computer-implemented method for assigning a user to one or more web community groups. This method can include a computer system receiving a data item associated with a user. The computer system can receive an update to the data item associated with the user. The computer system can compare the updated data item with a membership criteria for at least one web community group. In response to the update data item matching the membership criterion of one of the at least one web community group, the computer system can assign the user to the one web community group.

Yet another aspect of the present invention provides a system for providing a virtual community by way of a distributed network. This system can include a web server that provides content associated with a virtual community to a client device by way of the network and that receives content from the client device by way of the network. The system can also include a computer system logically coupled to the web server. The computer system can include at least one module that maintains information regarding users of the virtual community, maintains information regarding at least one group, and maintains membership information identifying member users for each group. The computer system can also include a group populating rules engine that applies a set of rules for populating the users into the groups based on the information regarding the users and at least one group membership criterion. The computer system can also include a groups module that interacts with the rules engine to assign the users to groups based on the application of the rules to the information regarding the users. The computer system can also include at least one data storage device for storing the information regarding the one or more users of the web community, the information regarding the at least one group, the membership information, and the set of rules.

Yet another aspect of the present invention provides a computer program product for populating a web community group. This computer program product can include a computer-readable storage medium having computer-readable program code embodied therein. The computer-readable program code include computer-readable program code for monitoring for an event; computer-readable program code for applying, in response to detecting the event, a rule including membership criteria for the web community group to a user profile for each user of the web community. Each user profile comprising information associated with the corresponding user. The computer-readable program code can also include computer-readable program code for associating each user whose user profile meets the membership criteria for the web community group with the web community group; and computer-readable program code for storing the associations in at least one data store.

Yet another aspect of the present invention provides a computer-implemented method for populating a web community group. This method can include a computer system receiving a hierarchical structure comprising users of a web community. The computer system can populate web community groups with the users based on the hierarchical structure.

DETAILED DESCRIPTION OF THE EXEMPLARY EMBODIMENTS

The present invention provides systems and methods for automatically populating users of a web community into groups. The users may be assigned to, or otherwise associated with, one or more groups in response to an event associated with the user, with another user, with a group, or other type of event. The users may also be removed from a group in response to an event. The population of users into groups can be controlled by a configurable set of rules. These rules can include a variety of criteria for associating a user with, or removing a user from, a group in response to an event. The criteria can include criteria based on user information and criteria based on group information. The systems and methods described herein can be applied to a variety of web communities, including social networking websites and business-related networking websites.

Figure 1:
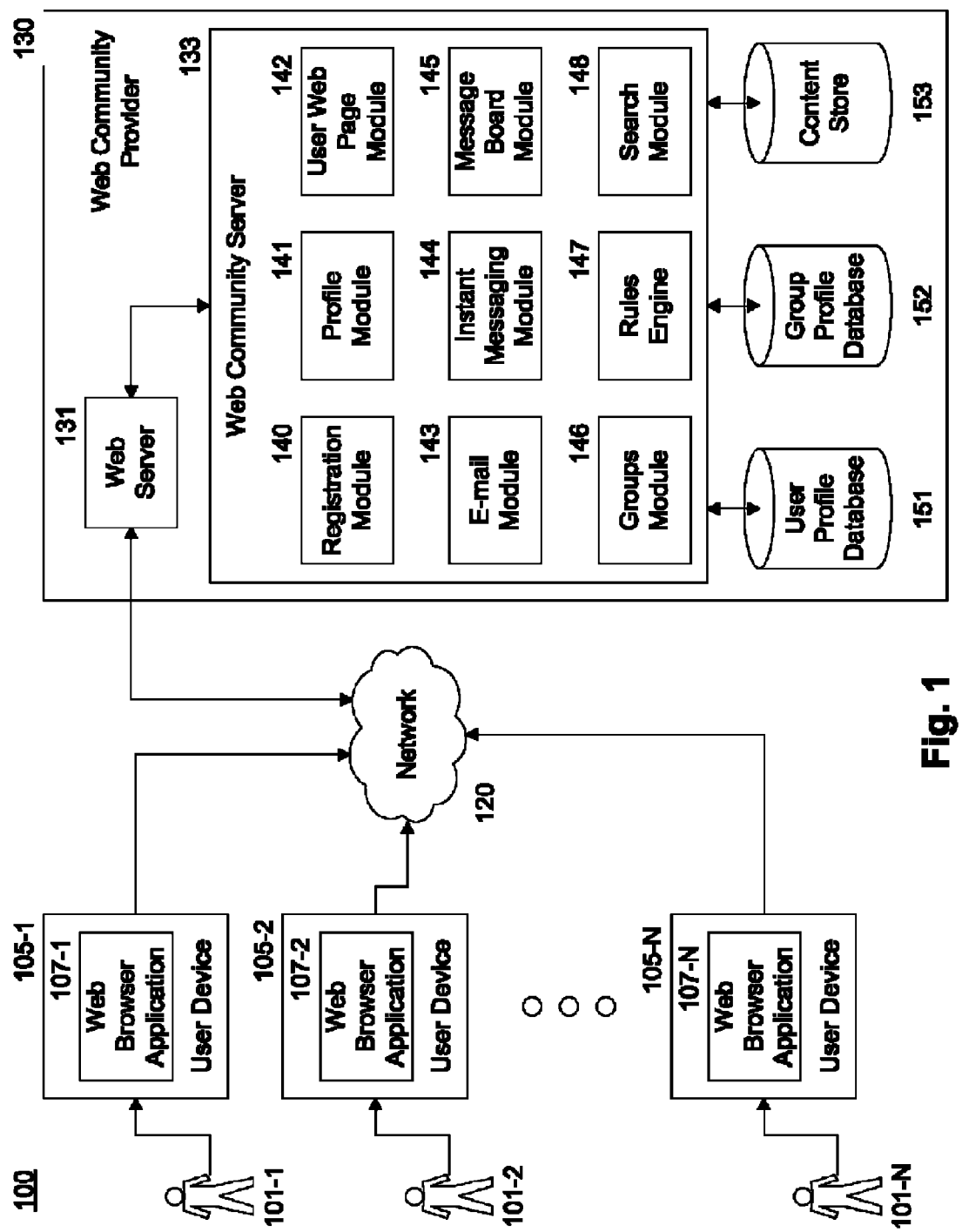
FIG. 1 is a block diagram depicting an operating environment, in accordance with certain exemplary embodiments of the present invention.

Turning now to the drawings, in which like numerals represent like (but not necessarily identical) elements throughout the figures, exemplary embodiments of the present invention are described in detail. FIG. 1 is a block diagram depicting an operating environment 100, in accordance with certain exemplary embodiments. Referring to FIG. 1, the exemplary operating environment 100 includes a web community provider 130 that provides a web community for one or more users, such as users 101. The users 101 can access the web community by way of user device 105 having a web browser application 107 residing thereon. The user device 105 may be a personal computer, mobile device, (e.g., notebook computer, tablet computer, netbook computer, personal digital assistant (PDA), video game device, GPS locator device, cellular telephone, or smartphone), or other appropriate technology that includes or is coupled to a web browser application 107, such as MICROSOFT'S INTERNET EXPLORER or MOZILLA'S FIREFOX.

The web browser application 107 interacts with a web server 131 of the web community provider 130 by way of a distributed network 120, such as the Internet. In certain exemplary embodiments, the web browser application 107 interacts with a web server operating application (not shown) residing on the web server 131. Generally, the web server 131 delivers content, such as web pages, to the web browser application 107 in response to a request. A web page is a document or resource of information that can be accessed using the web browser application 107. The web server 131 also receives content, such as profile information, search requests, messages, pictures, videos, or other content, from the web browser application 107.

The web server 131 may include one or more physical web servers or one or more virtual web servers. In certain exemplary embodiments, the web server 131 is hosted in a cloud computing environment. Although this exemplary embodiment is in terms of a "web" community, the web community can be hosted on other types of networks, including a local area network (LAN), private wide area network (WAN), mobile device carrier network, or another network and is not restricted to the World Wide Web. For example, the web community may be a private community intended for an organization, such as a business or university. In such an example, the web community may be hosted on the organization's LAN or WAN.

The web server 131 is logically coupled to a web community server 133 that provides the functionality of the web community. The web community server 133 can include an applications server, a group of servers, or another computing device or system. In addition or in the alternative, some or all the functions of the web community server 133 may be performed by the web server 131. The exemplary web community server 133 includes a registration module 140, a profile module 141, a user web page module 142, an e-mail module 143, an instant messaging module 144, a message board module 145, a groups module 146, a rules engine 147, and a search module 148. The exemplary web community server 133 is logically coupled to a user profile database 151, a group profile database 152, and a content store 153. Alternatively, one or more of the user profile database 151, the group profile database 152, and the content store 153 may be stored on the web community server 133.

The web server 131 can request content from the web community server 133 and provide the content to the web browser application 107. For example, a user 101 can request (by way of the web browser application 107) a web page associated with the web community from the web server 131 and, in turn, the web server 131 can interact with the web community server 133 to obtain the requested web page. The web server 131 can then deliver the requested web page to the web browser application 107. Similarly, the web server 131 can provide content to the web community server 133. For example, a user 101 may compose a message to another user 101 using the web browser application 107. The web server 131 can receive the composed message from the web browser application 107 and route the received message to the web community server 133. The web community server 133 can then process the message and store the message in the content store 153.

The registration module 140 facilitates new users 101 joining the web community. The registration module 140 may provide a web page to the web browser application 107 associated with a user 101, for example in response to a user 101 initiating a request to join. This web page may include a form or other means for obtaining information from the user 101, such as the user's name, contact information (e.g., residential address, e-mail address, and telephone number), and any other information.

The profile module 141 creates and maintains user profiles for users 101 of the web community. The profile module 141 may create a user profile in response to a new user joining the web community and store the user profile in the user profile database 151 or other data repository stored on or coupled to the web community server 133. The profile module 141 may interact with the registration module 140 to obtain the information provided by the user 101. The profile module 141 also allows users 101 (or an administrator) of the web community to update their user profiles. For example, the profile module 141 may provide a web page to the web browser application 107 that enables the user 101 to add, modify, or delete profile information.

The profile module 141 may also interact with another database (not shown), such as a member, organization, or employee database, to obtain user profile information. The profile module 141 may create (e.g., automatically) user profiles using the information from this database. In addition or in the alternative, the profile module 141 may use information obtained from the user 101 during the registration process and information obtained from another database to create a user profile. For example, the profile module 141 may use registration information (e.g., name, e-mail address, or employee identifier) to find information regarding an employee in an employee database and populate at least a portion of the employee's user profile with information from the employee database. The profile module 141 may create or modify a user profile automatically in response to a new user 101 being added to the database or a change in information associated with a user 101 that is stored in the database. For example, if an employee is promoted and information regarding the promotion is updated in an employee database, the profile module 141 can interact with the employee database to update the user profile for that user 101.

The profile information for a user 101 can include, but is not limited to, the name of the user 101, contact information (e.g., residential address, telephone number, and e-mail address), interests and hobbies of the user 101, background information, and any other information associated with the user 101. The user profile information can also include information describing relationships between the user 101 and other users. For example, the user profile information can include information identifying friends, colleagues, family members, classmates, partners, idols, or other users associated with the user 101. In a business organization embodiment, the profile information may include information identifying customers, managers, subordinates, or other hierarchical or organizational information. For a business organization, the profile information for customers or sales personnel may include product-specific information. The relationships stored in the user profiles can be specified by the user 101, an administrator, or by the web community server 133. The user profile information may also include information identifying a category for the user 101. For example, each user 101 of the web community may be assigned a category based on that user's hierarchical level within an organization. The user profile information can also include information identifying groups that the user 101 is a member of. In certain exemplary embodiments, the user profile information also includes awards or badges achieved by the user 101, where these awards or badges are associated with the community or underlying organization.

The user web page module 142 provides each user 101 with at least one personal web page. The user web page module 142 may allow the user 101 to customize a portion or all of that user's web page. A user's web page may include a display of certain profile information, pictures, videos, products or services that the user 101 offers for sale, or any other content displayable by a web page. A user's web page may also include a "virtual wall" for the user 101 and other users to post messages and other content, such as pictures and videos, to. A user's web page may also include a news feed that displays recent activity of the user 101, other users connected with the user 101, or groups that the user 101 is a member of, including hypertext links to community web pages associated with these other users or groups.

Connections or relationships between users 101 can be used to control access to content within the web community. In certain exemplary embodiments, access to a user's web page or certain content displayed on a user's web page may be limited to certain users. For example, a user's web page may be classified as "private" such that only users 101 having a relationship or connection (e.g., friend or colleague) with the user 101 can access the user's web page. In certain exemplary embodiments, users 101 may be able to send messages to other users that the user 101 has a connection with only.

Figure 7:
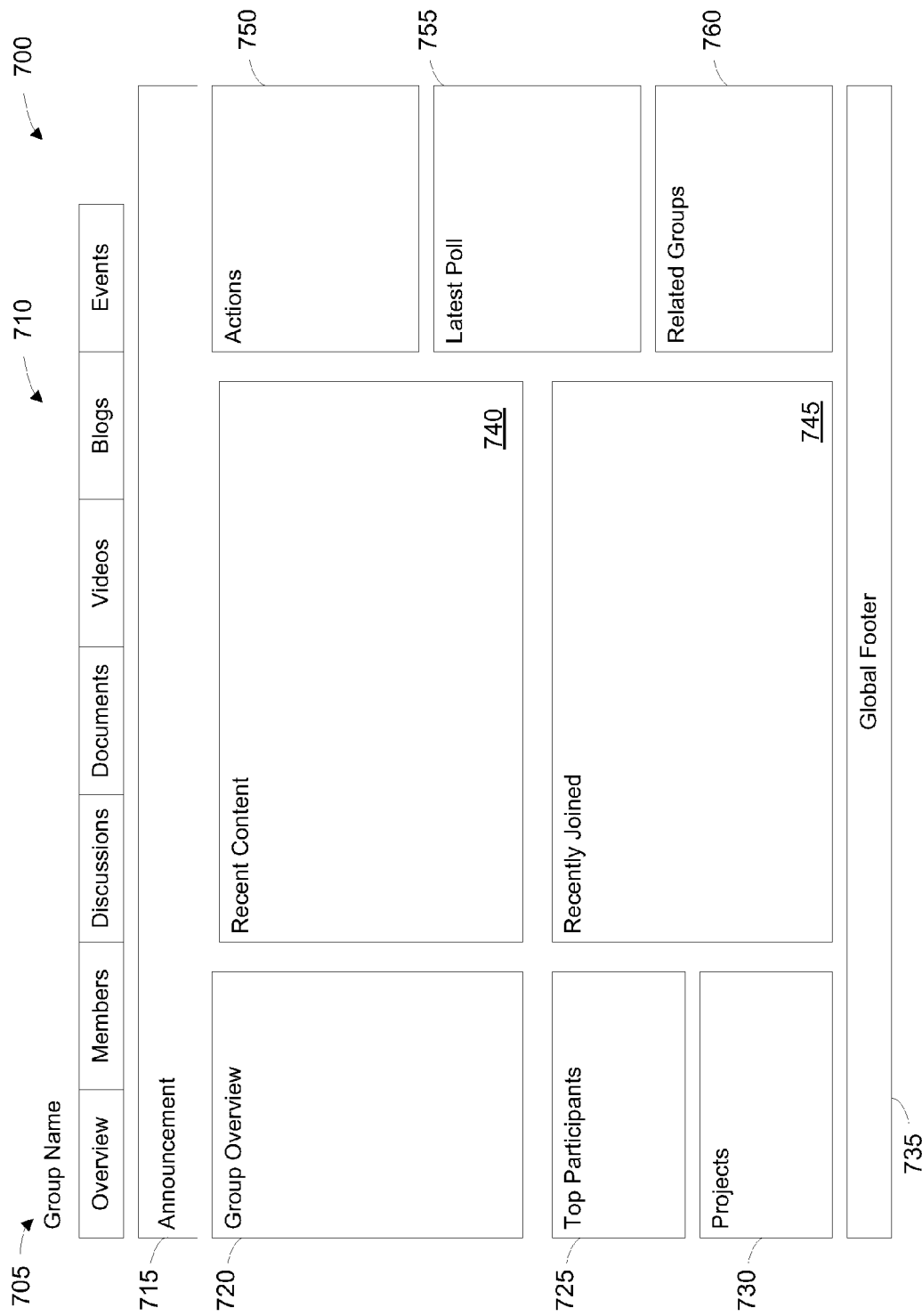
FIG. 7 is a block diagram depicting a group web page, in accordance with certain exemplary embodiments of the present invention.

The exemplary web community server 133 provides several mechanisms that enable users 101 to communicate with one another and to access content of interest. The e-mail module 143 enables users 101 to send and receive e-mails. The e-mail module 143 may automatically The groups module 146 facilitates the web community's groups. A group enables users 101 sharing a common interest (or other link) to communicate and share content with one another. For example, a group may include a virtual wall or forum for group members to post messages and other content for other members to access. A group may also have a dedicated web page (or multiple web pages) in which members can access content related to the group. For example, a user 101 or administrator may post news updates, videos (e.g., training videos), product brochures, or other content to the group's web page. Other members of the group or visitors can access the group's web page and view the content. A group member may also create an event associated with a product or a cause. For example, a user 101 may create an event, such as a videoconference or offline social event associated with a new product launch. In response, the groups module 146 may automatically send invites for the event to the group's members including information associated with the event. An example of a group web page is illustrated in FIG. 7 and described below.

A group can be created by a user 101 or an administrator of the web community. For example, a user 101 may create a group based on a topic or product of interest. A group can be private, where only members of the group can access the group's content, or public, whereby all (or a substantial portion) of the users 101 of the web community can access the content. In certain exemplary embodiments, the user 101 that created the group or another user 101 may specify whether the group is public or private. Each group may have an administrator or owner user 101 that can control settings and otherwise manage the group. For example, the administrator or owner user 101 may control membership in the group.

The web community server 133 maintains a group profile for each group. The group profiles may be stored in the group profile database 152 or other data repository stored on or coupled to the web community server 133. This group profile information can include, but is not limited to, a title or subject of the group, membership criteria, whether the group is public or private, information identifying members of the group, and information identifying an administrator or owner of the group. Other information associated with a group can be included with a group profile without departing from the scope and spirit of the present invention.

Membership in a group may provide access to certain content within the web community that non-members are excluded from. For example, the web page for a group may be private. In addition, non-group related content may be accessible by members of a group or of certain groups only. For example, in a business organization web community, internal content, such as training videos, employee benefits information, and new product development information, may be accessible by members of employee groups, but not accessible by customers or visitors. When a user 101 tries to access such content, the web community server 133 examines the criteria for accessing the content and the user profile of the user 101 to determine whether to grant access to the content.

The exemplary groups module 146 is operable to populate users 101 into groups of the web community. In certain exemplary embodiments the groups module 146 assigns users 101 to groups automatically based upon one or more rules. A set of rules can be stored in and maintained by the rules engine 147 at the web community server 133. Each of the rules can include a variety of criteria for determining which, if any, group a user 101 should be assigned to. These criteria can include, but is not limited to, user profile information and group profile information. That is, users 101 having certain profile information may be assigned to a certain group. For example, a user 101 with a certain job title stored in that user's profile may be automatically assigned to groups defined for those users 101 having that job title. In another example, users 101 residing in a certain geographical area may be automatically assigned to a group created for that area.

Users 101 may be assigned to a group in response to an event. An event can include, but is not limited to, the user 101 joining the web community, a change in profile information for the user 101, a change in profile information for another user 101, a change in profile information for a group, a user leaving the web community, a new group being added, an existing group being terminated, a time period expiring, or a user 101 establishing a connection or terminating a connection with another user 101. For example, if the web community includes a group for users residing within a certain geographical area, when a new user living in that area joins the web community, the new user may be automatically assigned to the group. In another example, if a group is terminated or otherwise removed from the web community, users 101 assigned to that group may be assigned to another group. In yet another example, if a new group is created and membership criteria is defined for the new group, the users 101 meeting the membership criteria may be automatically assigned to the group.

The web community server 133 may also automatically create groups. For example, the web community server 133 may create one or more groups for each user 101. A user's group may be pre-populated with other users that are connected to or otherwise associated with that user 101. For example, in a business organization embodiment, the web community server 133 may create a "subordinates group" for each user 101 classified as a manager (or that has other users connected to the user 101 as a subordinate). The user's subordinates group may then be populated with each user that is a subordinate of the user 101, for example based on a rule. In a social networking community, each social networking "friend" of the user 101 may be populated into a group for the user 101.

To further illustrate this automatic group creation, take an organization with Mary as the Director of U.S. Sales. Mary has two managers that report to her: John, the Director for Western U.S. Sales and Betty, the Director of Eastern U.S. Sales. Both John and Betty have regional sales managers that report to each of them and these regional sales managers have sales professionals that report to the regional sales managers. In this illustration, the web community server 133 would automatically create a group that includes as its members the regional sales managers that report to John and sales professionals that report to the regional sales managers. Similarly, the web community server 133 would automatically create a separate group that includes as its members the regional sales managers that report to Betty and the sales professionals that report to those regional sales managers. Further, the web community server 133 would automatically create a third group that includes all the members of the other two groups and John and Betty. This third group would be Mary's subordinates. Of course, the rules can be designed to capture only specific levels within an organization in defining this type of group (e.g., limiting the group to upper and middle managers). The operations illustrated are described in greater detail below, in connection with FIG. 3.

The search module 147 enables users 101 to search for other users or for groups. The search module 147 may allow the user 101 to search for a user or group based on profile information. For example, a user 101 may enter search criteria into a web page provided by the search module 147 and initiate a search. In response, the search module 147 may search within the user profile database 151 and/or the group profile database 152 for users or groups meeting the search criteria. The search module 147 can then provide a web page including the search results to the web browser application 107 associated with the user 101. The user 101 may then make a connection or request a connection with one or more of the users found in the search. This search feature may be available to members of the web community and to visitors. In certain exemplary embodiments, visitors that are not registered with the web community may have a limited amount of search capability relative to that of members of the web community. For example, the search results for a visitor may include names (or usernames) of users matching a search request only, while the search results for a member may include a photo, contact information, or a link to a web page for the users matching the search request.

Figure 2:
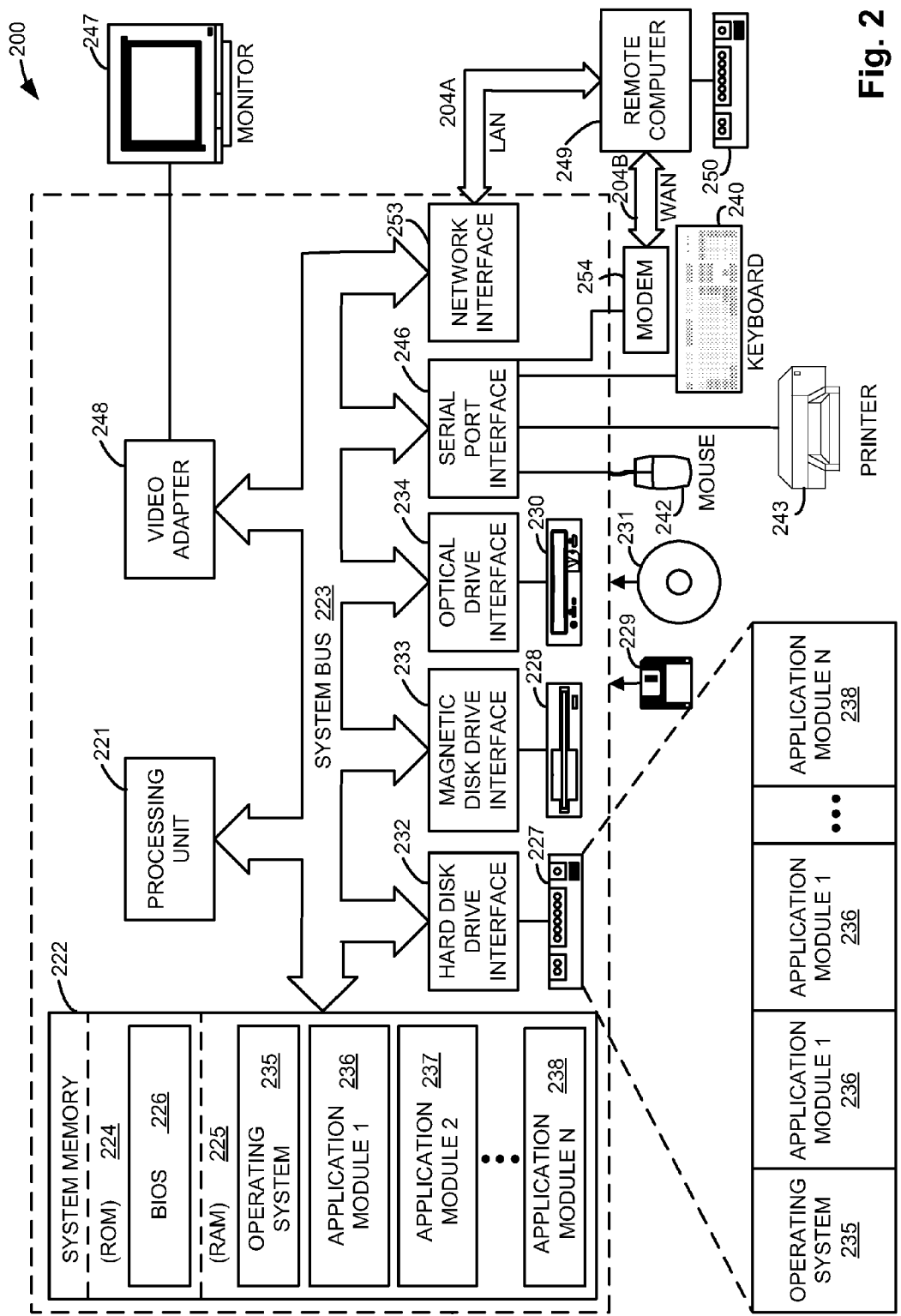
FIG. 2 is a block diagram depicting a general component architecture of a computer system, in accordance with certain exemplary embodiments of the present invention.

One or more of the components of the exemplary operating environment 100, such as the user device 105, the web server 131, and the web community server 133, can include one or more computer systems, such as the computer system 200 illustrated in FIG. 2. Referring to FIG. 2, the computer system 200 includes a processing unit 221, a system memory 222, and a system bus 223 that couples system components, including the system memory 222, to the processing unit 221. The system bus 223 can include any of several types of bus structures, including a memory bus or memory controller, a peripheral bus, or a local bus, using any of a variety of bus architectures. The system memory 222 includes a read-only memory ("ROM") 224 and a random access memory ("RAM") 225. A basic input/output system (BIOS) 226 containing the basic routines that help to transfer information between elements within the computer system 200, such as during start-up, is stored in the ROM 224.

The computer system 200 also includes a hard disk drive 227 for reading from and writing to a hard disk (not shown), a magnetic disk drive 228 for reading from or writing to a removable magnetic disk 229 such as a floppy disk, and an optical disk drive 230 for reading from or writing to a removable optical disk 231 such as a CD-ROM, compact disk-read/write (CD/RW), DVD, or other optical media. The hard disk drive 227, magnetic disk drive 228, and optical disk drive 230 are connected to the system bus 223 by a hard disk drive interface 232, a magnetic disk drive interface 233, and an optical disk drive interface 234, respectively. Although the exemplary computer system 200 employs a ROM 224, a RAM 225, a hard disk drive 227, a removable magnetic disk 229, and a removable optical disk 231, other types of computer-readable media also can be used in the exemplary computer system 200. For example, the computer-readable media can include any apparatus that can contain, store, communicate, propagate, or transport data for use by or in connection with one or more components of the computer system 200, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer-readable media can provide nonvolatile storage of computer-executable instructions, data structures, program modules, and other data for the computer system 200.

A number of modules can be stored on the ROM 224, RAM 225, hard disk drive 227, magnetic disk 229, or optical disk 231, including an operating system 235 and application modules 236-238. Application modules 236-238 can include routines, sub-routines, programs, objects, components, data structures, etc., which perform particular tasks or implement particular abstract data types. Application modules can include a web browser application, such as web browser application 107 depicted in FIG. 1.

A user, such as user 101, can enter commands and information to the computer system 200 through input devices, such as a keyboard 240 and a pointing device 242. The pointing device 242 can include a mouse, a trackball, an electronic pen that can be used in conjunction with an electronic tablet, or any other input device, such as a microphone, joystick, game pad, satellite dish, scanner, or the like. These and other input devices are often connected to the processing unit 222 through a serial port interface 246 that is coupled to the system bus 223, but can be connected by other interfaces, such as a parallel port, game port, a universal serial bus (USB), or the like. A display device 247, such as a monitor, also can be connected to the system bus 223 via an interface, such as video adapter 248. In addition to the display device 247, the computer 220 can include other peripheral output devices, such as speakers (not shown) and a printer 243.

The computer system 200 is configured to operate in a networked environment using logical connections to one or more remote computers 249. The remote computer 249 can be any network device, such as a personal computer, a server, a client, a router, a network PC, a peer device, or other device. While the remote computer 249 typically includes many or all of the elements described above relative to the computer system 200, only a memory storage device 250 has been illustrated in FIG. 2 for simplicity. The logical connections depicted in FIG. 2 include a LAN 204A and a WAN 204B. Such networking environments are commonplace in offices, enterprise-wide computer networks, intranets, and the Internet.

When used in a LAN networking environment, the computer system 200 is often connected to the LAN 204A through a network interface or adapter 253. When used in a WAN networking environment, the computer system 200 typically includes a modem 254 or other means for establishing communications over the WAN 204B, such as the Internet. The modem 254, which can be internal or external, is connected to system bus 223 via a serial port interface 246. In a networked environment, program modules depicted relative to computer system 200, or portions thereof, can be stored in the remote memory storage device 250.

It will be appreciated that the network connections shown are exemplary and other means of establishing a communications link between the computers can be used. Moreover, those skilled in the art will appreciate that the computer system 200 illustrated in FIG. 2 can have any of several other suitable computer system configurations.

An exemplary web community hosted by the web community provider 133 will now be described with reference to FIG. 1. This exemplary web community supports communication and collaboration between members of a product sales organization and their customers. This exemplary web community is not intended to limit the scope of the invention described herein, and instead, is provided to illustrate one particular embodiment of the invention as it relates to a particular community.

Figure 8:
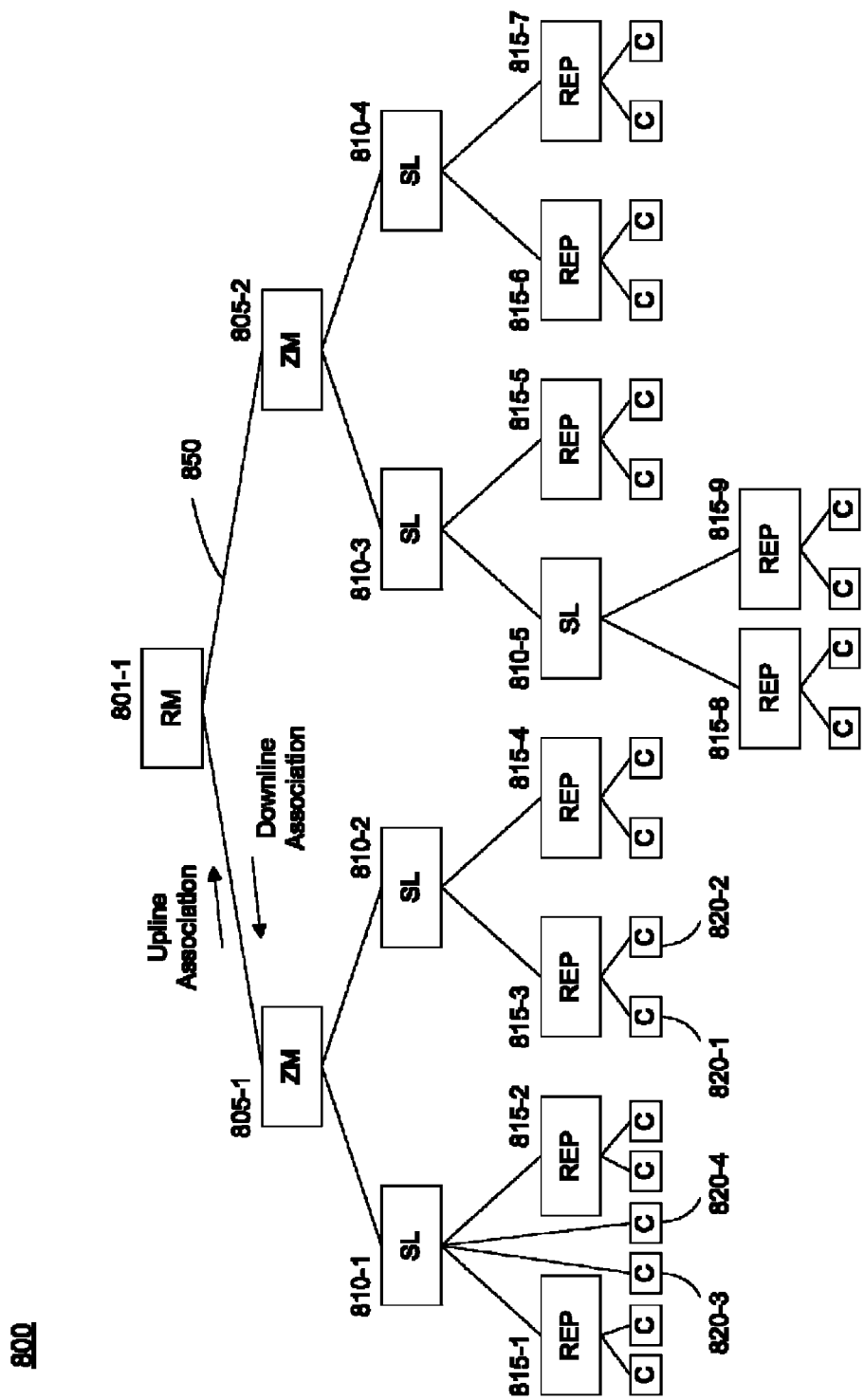
FIG. 8 is an organization chart for a product sales organization, in accordance with certain exemplary embodiments of the present invention.

A product sales organization can include a hierarchy of product representatives, sales leaders, managers, alumni (e.g., retired members), and other members. For example, a product sales organization may include levels of management, including sales leaders that provide mentoring to product representatives, zone managers responsible for one or more particular areas, and divisional managers responsible for multiple zones, to name a few. An organization chart 800 for a portion of an exemplary product sales organization is depicted in FIG. 8. Referring to FIG. 8, the exemplary product sales organization includes a regional manager 801-1, zone managers 805, sales leaders 810, and product representatives 815. Also depicted in the exemplary organization chart 800 are customers "C."

The organizational hierarchy includes a series of upline and downline associations, represented in FIG. 8 by the connections, such as connection 850, between members. A downline for a member of the organization includes other members linked to that member, but at a lower level within the hierarchy. Similarly, an upline for a member of the organization includes other members linked to that member, but at a higher level within the hierarchy. For example, the downline for zone manager 805-1 includes sales leaders 810-1 and 810-2. The downline for zone manager 805-1 also includes representatives 815-1, 815-2, 815-3, 815-4, and their customers. The upline for representative 815-7 includes sales leader 810-4, zone manager 805-2 and regional manager 801-1. The terms "upline" and "downline" are used herein to represent relative positioning of members in an organizational structure. As used herein, these terms are not limited to a top-to-bottom, or vertical, organizational structure, but may also be applied to a horizontal organizational structure, matrix organizational structure, or other organizational structure where linear relationships between members can be defined. Although in this exemplary embodiment, the uplines and downlines include managers (i.e., zone managers 805 and regional manager 801), the uplines and downlines may be limited to a portion of the levels of the organization only. For example, in certain exemplary embodiments, an upline for a representative 815 may include sales leaders 810 only.

Referring now to FIGS. 1 and 8, each member user 101 of the organization hierarchy can include a user profile within the community and one or more web pages for that user 101. These web pages can include content based upon the level of the user 101 within the organization hierarchy. For example, a web page for a sales leader 810 may include a module that allows a visitor to request to become a product representative, while a web page for a product representative 815 may not. This module can prompt interested visitors to the sales leader's web page to provide contact information so that the sales leader 810 can follow up. In another example, a member of the organization that actively sells products (e.g., product representative 815 or sales leader 810 that sell products, such as sales leader 810-1), may include product information modules, product brochures, or links to product-specific web pages on that member's web page. A sales leader's web page may have training videos that are accessible to representatives only. In another example directed towards an embodiment for a direct seller of beauty products, a web page for a product representative 815 may include a link to that representative's personalized store. The product representative 815 can customize their personalized store web page to display content for that representative's customers. A web page for a product representative may also include product selection tools, such as a virtual beauty or fashion makeover tool, for customers to interact with. These product selection tools may store product recommendations for the product representative 815 or the customer to access.

The user profiles within this exemplary web community can include user profile information described above and further include information identifying their level within the organization hierarchy (e.g., representative, sales leader, etc.), information describing the user's upline associations, and information describing the user's downline associations. The profile information can also include information regarding the sales activity of a user 101 (e.g., a representative 815 or actively selling sales leader 810), a category based on the number or dollar (or other currency) amount of products sold by the user 101 (sales status), and any awards or badges achieved by the user 101.

If the status of a user 101 or any other profile information of the user 101 changes, then the profile information can be updated to reflect that change. For example, a product representative 815 may be promoted to a sales leader position or may become inactive. Information identifying the status of the representative 815 may be updated by the representative 815, by an administrator, by another member, such as a zone manager 805 or sales leader 810, or by the web community server 133 automatically based on information contained in an associated computer system, such as an employee or organization database. In response, the web community server 133 may update (e.g., automatically) the upline and downline associations for a member whose status has changed. For example, if a product representative becomes inactive or moves into a non-sales role, that representative's downline associations may be disbanded or automatically assigned to another member within the organization. This feature is described in further detail in connection with FIG. 6.

The search module 148 (or another module logically coupled to the web community server 133) can include a feature for customers to find a representative 815. Customers assigned to representatives 815 (or sales leaders 810) and those that are not (unattached customers) may have access to this feature to find a representative 815. A customer may be able to search for a representative 815 based on user profile information, such as name, geographical location, sells activity, sales status, awards or badges achieved, or level within the organization hierarchy (e.g., representative 815, sales leader 810, etc.). If the customer finds a representative 815 of interest, the customer can request to become associated with that representative 815. The representative 815 (or an administrator) may receive this request and add the customer to the downline of that representative 815. Alternatively, the customer may be automatically added to the representative's downline associations.

To further illustrate this feature of a customer joining the product sales organization web community, the following example is provided. A customer, Julie is interested in a product that the organization offers. Julie may find the web community by performing an Internet search for the product or by entering a Uniform Resource Locator (URL) for the web community into the web browser application 107. The URL may be provided to Julie on the packaging of a product or by an invitation from a member of the web community, for example. After arriving at a landing page of the web community, Julie may become more interested in a product and want to learn more about the product from a representative. At this point, Julie may notice a "Find-a-Rep" module on the landing page or on another web page of the web community. Julie can then enter information into the Find-a-Rep module, such as an address or zip code proximal to Julie, and initiate a search. After browsing representatives in the search results, Julie finds a representative, Emily, that she is interested in interacting with. Julie can then actuate a link to the Emily's web page. Emily's web page can include a user interface provided by the registration module 140 that enables Julie to provide profile information. After Julie enters her profile information, the web community server 133 receives the information and the profile module 141 creates a user profile for Julie. The profile module 141 automatically includes an association or connection with Emily in Julie's user profile. The profile module 141 can also add a downline association for Julie in Emily's user profile. In response to Julie joining, the groups module 146 can interact with the rules engine 143 to assign Julie to one or more groups in the web community, such as Emily's downline group and a "new customers" group. The web community server 133 can notify Emily of the addition of Julie to the web community. The web community server 133 can also notify Julie of her membership in the group(s).

This exemplary product sales organization web community can include groups that support communication within the organization and with customers. Each member of the organization and customers that are registered with the web community can be assigned or otherwise associated with one or multiple groups. The groups can include user-created groups (e.g., for a particular topic), administrator-created groups, and/or groups automatically created by the web community server 133. As described above, the groups can be populated with users 101 based upon a set of rules.

The exemplary product sales organization web community can include a group dedicated to each hierarchical level within the organization. For example, the web community can include a group that includes as its members all customers. Another group can include as its members all representatives 815. Yet another group can include as its members all sales leaders 810. Yet another group can include as its members all zone managers 805. Yet another group can include as its members all regional managers 801.

The web community can also include groups for sublevels within a hierarchical level, such as product representatives meeting certain sales requirements or for levels of sales leaders, including executive sales leaders and senior sale leaders. These hierarchy-based groups can foster communication and collaboration between members having similar goals, responsibilities, and/or interests. The web community server 133 can automatically populate these hierarchy-based groups with the members that meet the criteria for the groups. For example, the web community server 133 can assign each customer to the customers group. The customers may be assigned to the customers group upon registering with the web community. In another example, in response to a member being promoted from sales leader to executive sales leader, the groups module 146 removes this member from the sales leader group and assigns the member to the executive sales leader group. Other exemplary transitions are provided below and discussed in further detail with reference to FIG. 6.

The exemplary product sales organization web community can also include support groups. Support groups are groups that provide support to users 101 for a specific temporary state. For example, the web community can include a group for new representatives, a group for new sales leaders, and a group for new customers. When a user 101 of a community transitions into a new role, that member may be placed into an appropriate support group for a time period. After the time period expires, the user 101 may be removed from the support group and assigned to the appropriate hierarchy-based group. For example, after being a customer for a year, a user 101 may be removed from a "new customers" group. In another example, after a certain number of purchases or time, a customer may be added to a "loyal customers" group.

The exemplary product sales organization web community can also include one or more downline groups for each user 101 having a downline. The user 101 can be the administrator or owner of their downline group(s). Each downline group may include the corresponding user 101 and all other users one level down the downline of the user 101. For example, a downline group for representative 815-1 may include the representative 815-1 and the customers 820-1 and 820-1 of that representative 815. An actively selling sales leader, such as sales leader 810-1, may have more than one downline group. For example, the sales leader 810-1 may have a first downline group that includes as its members the sales leader 810-1 and the sales leader's customers 820-3 and 820-4 and a second downline group that includes as its members the sales leader 810-1 and the representatives 815-1 and 815-1 in the sales leader's downline. The sales leader 810-1 may also have a third downline group that includes as its members the sales leader 810-1, the representatives 815-1 and 815-2, and the customers 820-3 and 820-4. This third downline group or a fourth downline group may include the membership of the third group and the customers of representatives 815-1 and 815-2. The downline groups can be automatically created and populated by the groups module 146.

The downline groups provide a community for the users 101 to communicate and collaborate with other users 101 that they are directly associated with. For example, a downline group for a representative 815 provides a mechanism for keeping in contact with customers that are members of the web community. The downline group for a representative 815 also provides a marketing tool. For example, the representative 815 may provide product information, such as brochures and videos, on the group web page, as well as promotional offers.

In certain exemplary embodiments, the hierarchy-based groups, the support groups, and the downline groups are automatically created by the web community server 133. In certain exemplary embodiments, the information shared by the group (e.g., messages, virtual walls, web pages, etc.) and the group membership for these groups are private and not accessible by non-members. In certain exemplary embodiments, other users 101 cannot request to join these groups as the membership to these groups may be reserved solely for users 101 meeting the criteria for the groups.

The exemplary product sales organization web community can also include custom groups. As the name implies, custom groups can be created and customized by users 101 of the community. The custom groups allow the users 101 to create groups to hold discussions and share content related to virtually any topic, including the products for sale by the organization, hobbies, interests, or any other topic. The custom groups can be public or private. Any member of the community, including customers and managers can join a public group, while only invited members may be able to join a private group. A user 101 that creates a custom group may be assigned to administrator or owner roles for that custom group.

In certain exemplary embodiments, the administrator or owner of a custom group can configure membership criteria for the custom group. In certain exemplary embodiments, the groups module 146 may provide an interface, such as a series of drop-down selectors for defining the membership criteria. The web community server 133 can populate the custom group based on the defined membership criteria. Membership criteria that a user 101 may define includes, but is not limited to, hierarchy level, member type (e.g., representative, customer, etc.), gender, zodiac sign, whether the user has children, length of time as current member type, spoken languages, whether the user is interested in products, zone, division, city, state, county, and postal code. The administrator or owner can also modify the membership criteria. In response to any modifications, the web community server 133 can remove members that no longer meet the criteria and assign any non-members that meet the modified criteria to the group.

FIG. 7 is a block diagram depicting a group web page 700, in accordance with certain exemplary embodiments. Referring to FIGS. 1 and 7, the exemplary group web page 700 includes a group name 705 and several navigation tabs 710 disposed near the top of the web page 700. The navigation tabs 705 allow a user 101 to navigate the web page 800 to access content. For example, this web page 700 includes a tab for navigating to each of an overview page, a member page, a discussions page (e.g., virtual wall, message board, or forum), a documents page, a videos page, a blog, and an events page. The web page 700 also includes an announcements area 715, a group overview area 720, a top participants area 725, a projects area 730, a footer 735 (that may be global throughout the web community), a recent content area a recently joined area 745 for displaying information regarding new members, an actions area 750, a poll 755, and a related groups area 760.

The exemplary operating environment 100 illustrated in FIG. 1 is described hereinafter with reference to the exemplary methods illustrated in FIGS. 3-6. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more acts described herein may be performed by hardware, software, or a combination thereof, as may be embodied in one or more computing systems.

Figure 3:
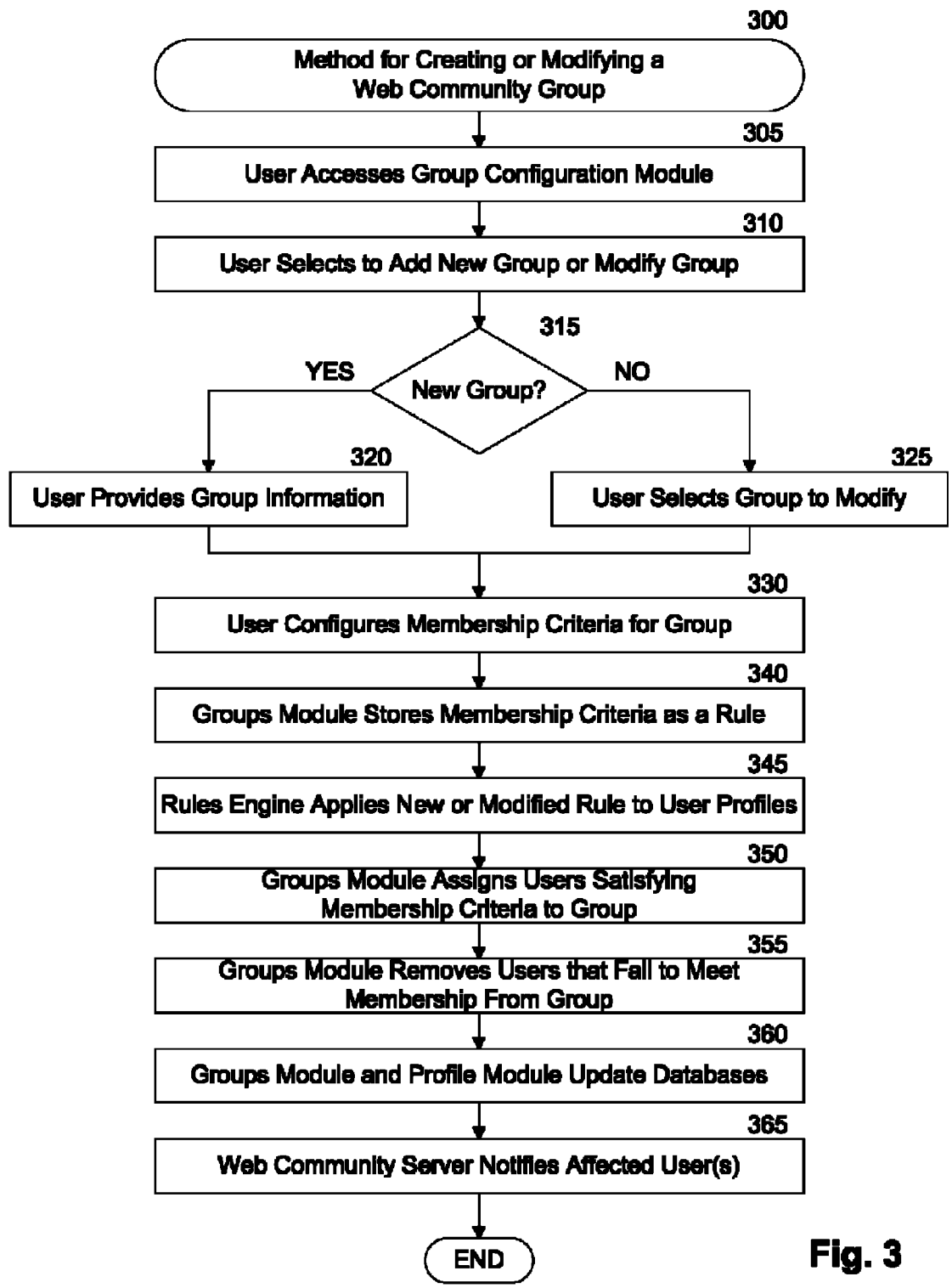
FIG. 3 is a flow chart depicting a method for creating or updating a web community group, in accordance with certain exemplary embodiments of the present invention.

FIG. 3 is a flow chart depicting a method 300 for creating or updating a web community group, in accordance with certain exemplary embodiments. Referring to FIGS. 1 and 3, in step 305, a user 101 (or administrator) accesses a group configuration module using a web browser application 107 executing on a user device 105. In certain exemplary embodiments, the group configuration module includes a web page provided by the groups module 146. On a landing page of the group configuration module, the user 101 may be prompted to select to either create a new group or to modify an existing group. In step 310, the user 101 selects one of the aforementioned items. In step 315, if the user 101 selects the create a new group option, the "YES" branch is followed to step 320. Otherwise, the "NO" branch is followed to step 325.

In step 320, the user 101 provides information regarding the new group. This group information can include a name or title for the group, communication options, whether the group is public or private, and any other information associated with the group. The group configuration module can provide a web page to the web browser application 107 that enables the user 101 to provide this information.

In step 325, the user 101 selects an existing group to modify. The group configuration module can provide a web page to the web browser application 107 that enables the user 101 to select a group. After the user 101 selects a group to modify, the group configuration module provides a web page that enables the user 101 to modify group information, including the name or title for the group, communication options, whether the group is public or private, and any other information associated with the group.

In step 330, the user 101 configures membership criteria for the group. The group configuration module can provide a web page for the user 101 to configure the membership criteria for the group. These membership criteria can include, but are not limited to, hierarchy level, member type (e.g., representative, customer, etc.), gender, zodiac sign, whether the user has children, length of time as current member type, spoken languages, whether the user is interested in products, zone, division, city, state, county, and postal code. The user 101 may select one or more membership criteria for defining membership in the group. For example, the user 101 may select a hierarchy level and a minimum length of time that the users have been at that hierarchy level. In another example, the user 101 may create (or modify) a group to include representatives within a certain city or state. In step 340, the groups module 146 interacts with the rules engine to save the membership criteria for the group as a rule.

In step 345, the rules engine 147 applies the rule to the user profiles stored in the user profile database 151 to determine which members should be included in the group. The rules engine 151 may perform this function in response to a new group being created or an existing group being modified. Alternatively, the rules engine 151 may perform this function based upon a time period. For example, the rules engine 151 may apply a set of rules to user profiles once a day or once a week to update group membership.

In step 350, the groups module 146 assigns users 101 meeting the membership criteria to the group. If the group included members that no longer meet the membership criteria, the groups module 146 removes those members from the group in step 355. In step 360, the user profiles database 151 and the group profiles database 152 are updated to reflect the group membership. The profile module 141 updates the user profile for each user 101 assigned to the group to include information describing the membership in the group. The profile module 141 also updates the user profile for each user 101 removed from the group to remove information describing membership in the group. The groups module 146 updates the group profile database 152 to indicate the members of the group. Based on this group membership, the users 101 may now have access to content within the web community that these users 101 previously could not access. Likewise, users 101 removed from the group may no longer have access to content that the removed users 101 previously had access to based on membership in the groups.

In step 365, each user 101 added to the group and each user 101 removed from the group is notified. For example, the web community server 133 may send each affected user 101 an e-mail, post a message on the user's virtual wall, update a news feed of the user 101, or send the user 101 a text message. The web community server 133 may also notify the owner of the group, members of the group, or announce the change in membership on the group's web page. For example, the web community server 133 may send the members of the groups an e-mail indicating the users 101 added to the group and/or users 101 removed from the group. The web community server 133 may post a message to the group's virtual wall indicating the users 101 added to the group and/or users 101 removed from the group. Referring to FIG. 7, the web community server 133 may also update the recently joined area 745 of the group's web page 700.

Although the method 300 has been discussed in terms of creating a new group or modifying an existing group, a user 101 (or administrator) may also be able to merge two or more groups using a similar method. The user 101 may be provided with a web page that allows the user 101 to select the groups to merge. The rules for each of the merged groups can then be used to determine membership for the groups resulting from the merge. That is, the new group formed using the two or more merged groups may include the rules for each merged group. Thus, the new group may include the members from each of the merged groups.

Figure 4:
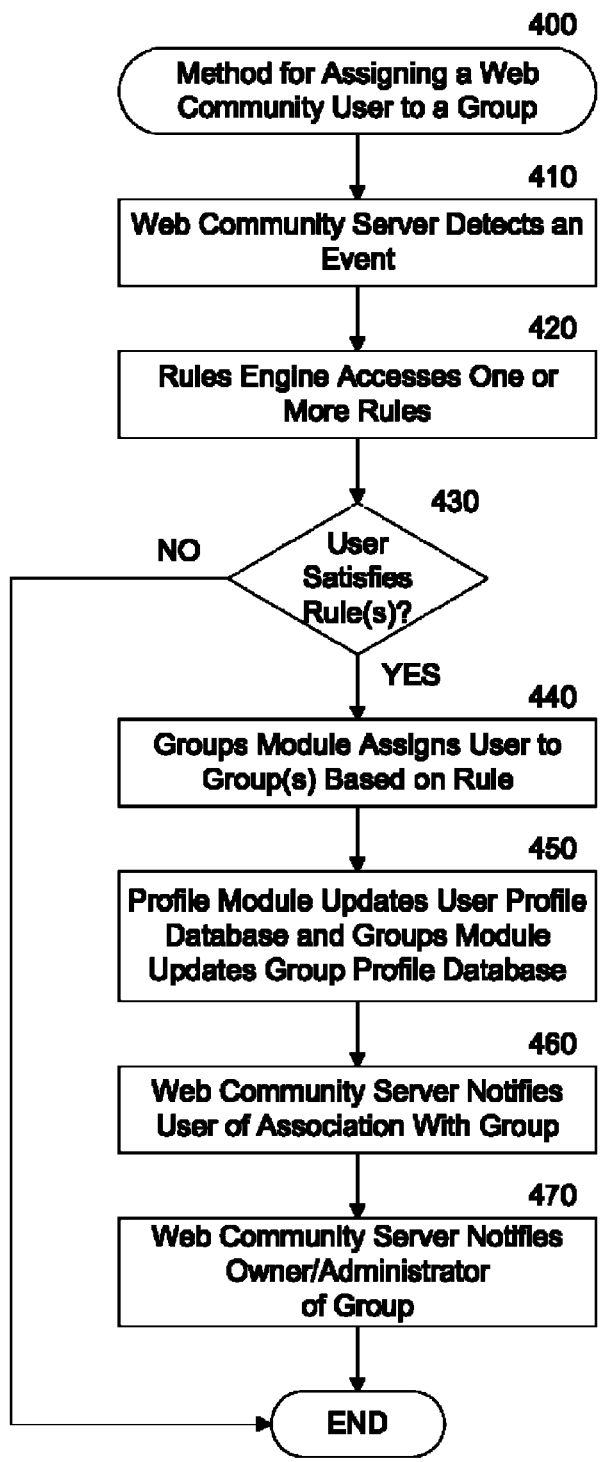
FIG. 4 is a flow chart depicting a method for assigning a web community user to a group upon detecting a certain event, in accordance with certain exemplary embodiments of the present invention.

FIG. 4 is a flow chart depicting a method 400 for assigning a user 101 to a web community group upon detecting a certain event, in accordance with certain exemplary embodiments. Referring to FIGS. 1 and 4, in step 410, the web community server 133 detects an event that triggers assigning a user 101 to a group. These events can include, but are not limited to, a new user 101 joining the web community, a change in profile information of the user 101, a change in profile information of a group, a change in profile information of another user, a new group being added, a group being terminated, or a user 101 modifying a connection with one or more other users 101. For example, if a new user 101 joins the web community, the user 101 may be associated with a group based on the profile information obtained during the registration process. In another example, a user's profile information may be updated to reflect a change in levels within the hierarchy (e.g., representative to sales leader). In this example, the user 101 may be removed from the representatives groups and associated with the sales leaders group. In yet another example, the membership criteria of a custom group may be modified such that the user 101 now qualifies or a new custom group may be created in which the user 101 qualifies. The event can also include the expiration of a time period. For example, the web community server 133 may update group membership based on a time period, such as once a day, once a week, or once a month. Similarly, after a certain time period as a member of a certain group, the user 101 may graduate to a new group, such as from a "new customer" group to a "loyal customer" group. In yet another example, a customer may change representatives 815 from a first product representative 815-1 to a second product representative 815-2. In response, the customer may be removed from a group for the first product representative 815-1 and assigned to a group for the second product representative 815-2.

In step 420, the rules engine 147 accesses one or more rules and applies the one or more rules to the user's profile information to determine whether the user 101 should be associated with a group. In certain exemplary embodiments, the rules associated with each group may be applied to the user's profile information to determine whether the user 101 should be associated with one or more groups. In certain exemplary embodiments, the one or more rules applied to the user's profile information may be dependent on the detected event. For example, if the membership criteria of a group changed, only the rule(s) associated with that group may be applied to the user's profile information.

In step 430, if the profile information of the user 101 satisfies the membership criteria of one or more rules, the "YES" branch is followed to step 440. Otherwise, the method 400 ends.

In step 440, the groups module 146 assigns the user 101 to the one or more groups corresponding to the rule(s) that the user's profile information satisfied in step 420. In step 450, the profile module 141 updates the user's profile in the user profile database 151 to reflect membership in the group(s). This updating may constitute an "event," which would trigger the method 400 again. The groups module 146 also updates the group profile for each group the user 101 is associated with in the group profile database 152 to reflect the user's membership.

In step 460, the web community server 133 notifies the user 101 of the assignment to the group(s). The web community server 133 may send the user 101 an e-mail, post a message on the user's virtual wall, update a news feed of the user 101, or send the user 101 a text message.

In step 470, the web community server 133 notifies the administrator or owner of each group that the user 101 has been assigned to and/or members of the group. The web community server 133 may send the owner or administrator an e-mail, send the owner or administrator an instant message, post a message on the group's virtual wall, update a news feed of the group, send the owner a text message, or send an e-mail to all group members. After step 470, the method 400 ends. Of course, the web community server 133 can continue to monitor for additional events and perform the method 400 in response to any appropriate events.

Figure 5:
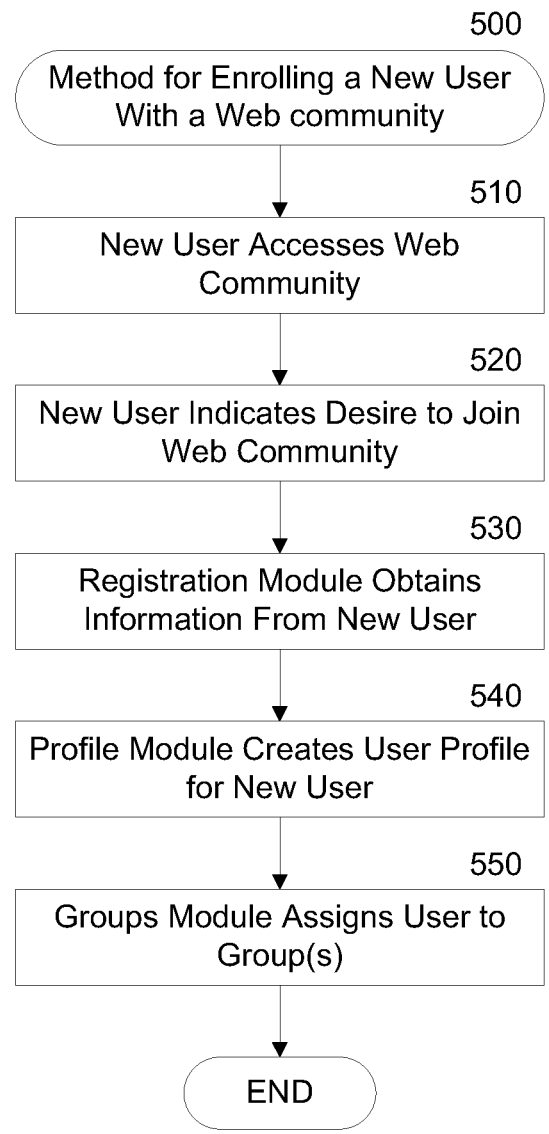
FIG. 5 is a flow chart depicting a method for enrolling a new user with a web community, in accordance with certain exemplary embodiments of the present invention.

FIG. 5 is a flow chart depicting a method 500 for enrolling a new user 101 with a web community, in accordance with certain exemplary embodiments. Referring to FIGS. 1 and 5, in step 510, a new user 101 accesses the web community using a web browser application 107 executing on a user device 105. The new user 101 may access the web community in response to an invitation, such as an online invitation, received from a current member of the web community. For example a representative may send a customer an online invitation to join the web community. The online invitation may be delivered to the customer by way of e-mail and include a link to a registration web page or to the representative's web page. The representative's web page may include a registration module that allows the new user 101 to register with the web community.

In step 520, the new user 101 indicates a desire to join the web community. For example, the new user 101 may actuate a "Join Web Community" link on a landing web page of the web community or on the representative's web page. In response, the registration module 140 may present a user interface (e.g., web page or pop-up) that prompts the new user 101 for information.

In step 530, the registration module 140 obtains information from the new user 101 by way of the user interface presented in step 520. This information may include the new user's name, contact information (e.g., residential address, e-mail address, and telephone number), and any other information. The information may also include information identifying a member of the web community that invited the new user 101.

In step 540, the registration module 140 interacts with the profile module 141 to create a user profile for the new user 101 and store the user profile in the user profile database 151. This user profile can include the information obtained in step 530.

In certain exemplary embodiments, the user profile for the user 101 may be populated with information prior to or after the new user 101 registers. For example, the web community server 133 may include or be logically coupled to an organization database that includes information for all members of an organization (and their customers). When a new user 101 joins, the information associated with the new user 101 may be compared to the organization database. If there is a match, then the user profile of the new user 101 may be populated with information stored in the organization database. For example, information regarding a customer including information identifying the customer's representative may be stored in the organization database. If that customer joins the web community, the information identifying the customer's representative may be included in the customer's user profile.

In certain exemplary embodiments, a new customer that joins the web community by way of a representative's web page may be automatically assigned to that representative. In such an embodiment, information identifying this representative may be included in the user profile of the new user 101.

In step 550, the groups module 146 may assign the new user 101 to one or more groups of the web community based on the user profile created in step 540. This step 550 may be substantially the same as steps 420 through 470 illustrated in FIG. 4 and discussed above.

Figure 6:
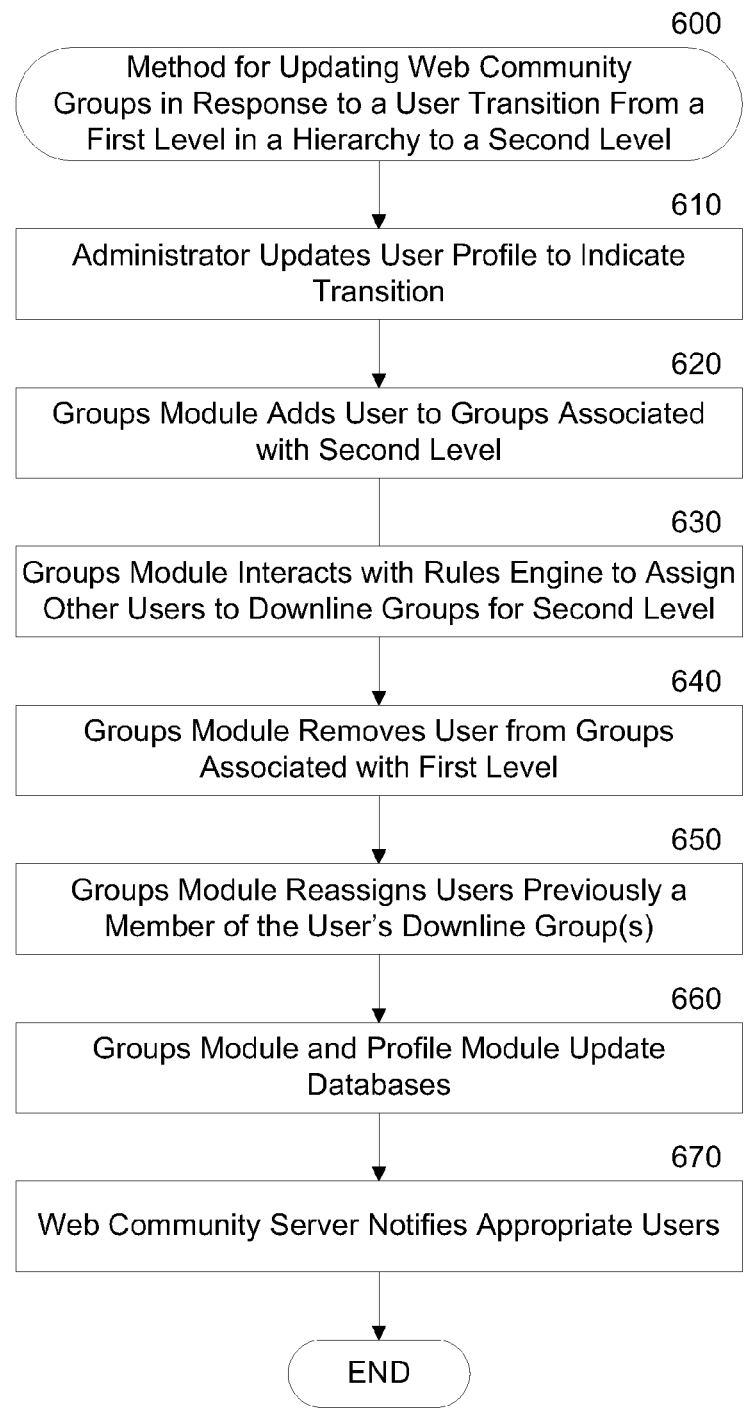
FIG. 6 is a flow chart depicting a method for updating web community groups in response to a user transitioning from one level in a hierarchy to another level, in accordance with certain exemplary embodiments of the present invention.

FIG. 6 is a flow chart depicting a method 600 for updating web community groups in response to a user 101 transitioning from one level in a hierarchy to another level, in accordance with certain exemplary embodiments. As discussed above, a product sales organization can include a hierarchy of product representatives, sales leaders, managers, alumni (e.g., retired members), and other members. Each member can include one or more downlines and a web community downline group for each downline. As members transition between levels in the hierarchy, downline groups may be added or removed based on these transitions. Table 1 below shows some exemplary transitions and web community groups that are added and removed in response to the transitions.

TABLE 1

Exemplary Transitions

| Transition From | Transition To | Groups Added To | Groups Removed From |
|---|---|---|---|
| Representative | Alumni | Alumni<br>A Downline Group of a Representative, Sales Leader, or Zone Manager | Representative Group(s)<br>Downline Group(s) of the former Representative<br>Downline Group(s) of Those in the Former Representative's Upline (e.g., Sales Leader and Zone Manager)<br>New Representative Support Group<br>Achievement Based Group(s) |
| Alumni | Representative | Representative<br>Downline Group(s) for the Representative<br>Downline Group(s) for Those in the Representative's Upline (e.g., Sales Leader and Zone Manager)<br>New Representative Support Group<br>Business Development Group(s)<br>Achievement Based Group(s) | Alumni<br>Downline Group(s) for Those in Alumni's upline (e.g., Representative, Sales Leader, or Zone Manager) |
| Customer | Representative | Representative<br>Downline Group(s) for the Representative<br>Downline Group(s) for Those in the Representative's Upline (e.g., Sales Leader and Zone Manager)<br>New Representative Support Group<br>Business Development Group(s)<br>Achievement Based Group(s) | Customer<br>Downline Group(s) for Those in Customer's upline (e.g., Representative, Sales Leader, or Zone Manager) |
| Divisional Manager | Representative | Representative<br>Downline Group(s) for the Representative<br>Downline Group(s) for Those in the Representative's Upline (e.g., Sales Leader and Zone Manager)<br>New Representative Support Group<br>Achievement Based Group(s) | Divisional Manager<br>Downline Group(s) of Divisional Manager |
| Divisional Manager | Sales Leader | Sales Leader<br>Downline Group(s) for the Sales Leader<br>Downline Group(s) for Those in the Sales Leader's Upline (e.g., Sales Leader and Zone Manager)<br>New Sale's Leader Support Group<br>Achievement Based Group(s)<br>Leadership Group | Divisional Manager<br>Downline Group(s) of Divisional Manager |
| Divisional Manager | Zone Manager | Zone Manager<br>Downline Group(s) for the Zone Manager<br>Downline Group(s) for Those in the Zone Manager's Upline (e.g., Divisional Manager) | Divisional Manager<br>Downline Group(s) of Divisional Manager |
| Representative | Divisional Manager | Divisional Manager<br>Downline Group(s) for the Divisional Manager | Representative<br>Downline Group(s) of Representative<br>Downline Group(s) for Those in Representative's upline |

TABLE 1-continued

Exemplary Transitions

| Transition From | Transition To | Groups Added To | Groups Removed From |
|---|---|---|---|
| | | | (e.g., Sales Leader or Zone Manager)<br>New Representative Support Group |
| Representative | Sales Leader | Sales Leader<br>Downline Group(s) for the Sales Leader<br>Downline Group(s) for Those in the Sales Leader's Upline (e.g., Zone Manager)<br>New Sales Leader Support Group<br>Achievement Based Group(s)<br>Leadership Group | Representative<br>Downline Group(s) of Representative<br>Downline Group(s) for Those in Representative's upline (e.g., Sales Leader or Zone Manager)<br>New Representative Support Group |
| Representative | Zone Manager | Zone Manager<br>Downline Group(s) for the Zone Manager<br>Downline Group(s) for Those in the Zone Manager's Upline (e.g., Divisional Manager) | Representative<br>Downline Group(s) of Representative<br>Downline Group(s) for Those in Representative's upline (e.g., Sales Leader or Zone Manager)<br>New Representative Support Group |
| Sales Leader | Divisional Manager | Divisional Manager<br>Downline Group(s) for the Divisional Manager | Sales Leader<br>Downline Group(s) of Sales Leader<br>Downline Group(s) for Those in Sales Leader's upline (e.g., Sales Leader or Zone Manager)<br>New Sales Leader Support Group<br>Leadership Group<br>Achievement Based Group(s) |
| Sales Leader | Representative | Representative<br>Downline Group(s) for the Representative<br>Downline Group(s) for Those in the Representative's Upline (e.g., Sales Leader and Zone Manager) | Sales Leader<br>Downline Group(s) of Sales Leader<br>Downline Group(s) for Those in Sales Leader's upline (e.g., Sales Leader or Zone Manager)<br>New Sales Leader Support Group<br>Leadership Group<br>Achievement Based Group(s) |
| Sales Leader | Zone Manager | Zone Manager<br>Downline Group(s) for the Zone Manager<br>Downline Group(s) for Those in the Zone Manager's Upline (e.g., Divisional Manager) | Sales Leader<br>Downline Group(s) of Sales Leader<br>Downline Group(s) for Those in Sales Leader's upline (e.g., Sales Leader or Zone Manager)<br>New Sales Leader Support Group<br>Leadership Group<br>Achievement Based Group(s) |
| Customer Not Associated with a Representative | Customer Associated with a Representative | Associated Representative's Downline Group<br>Topic Based Group(s) | N/A |
| Customer Not Associated with a Representative | Representative | Representative<br>Downline Group(s) for the Representative<br>Downline Group(s) for Those in the Representative's Upline (e.g., Sales Leader and Zone Manager)<br>New Representative Support Group<br>Business Development Learning/Training | Customer<br>Downline Group(s) of Representative of Customer |
| Visitor | Customer Associated | Customer<br>Associated Representative's | N/A |

TABLE 1-continued

Exemplary Transitions

| Transition From | Transition To | Groups Added To | Groups Removed From |
|---|---|---|---|
| Visitor | with a Representative Representative | Downline Group Topic Based Group(s) Representative Downline Group(s) for the Representative Downline Group(s) for Those in the Representative's Upline (e.g., Sales Leader and Zone Manager) New Representative Support Group Business Development Learning/Training Topic Based Group(s) | N/A |
| Zone Manager | Divisional Manager | Divisional Manager Downline Group(s) for the Divisional Manager | Zone Manager Downline Group(s) of Zone Manager Downline Group(s) for Those in Zone Manager's upline (e.g., Divisional Manager) |
| Zone Manager | Representative | Representative Downline Group(s) for the Representative Downline Group(s) for Those in the Representative's Upline (e.g., Sales Leader and Zone Manager) New Representative Support Group | Zone Manager Downline Group(s) of Zone Manager Downline Group(s) for Those in Zone Manager's upline (e.g., Divisional Manager) |

Referring to FIGS. 1 and 6, in step 610, an administrator updates the user profile of a user 101 to indicate a transition from a first level in a hierarchy to a second level in the hierarchy. For example, a representative may be promoted to a sales leader. In another example, a customer may become a representative. In certain exemplary embodiment, the user profile may be updated automatically to indicate a transition. For example, a member or representative database logically coupled to the web community server 133 may be updated to reflect a promotion. In response, the profile module 141 updates the user profile to reflect the transition.

In step 620, the groups module 146 assigns the user 101 to groups corresponding to the second level that the user 101 has transitioned to. For example, as shown in Table 1, when a user 101 transitions from a representative to a sales leader, the user 101 may be added to a sales leader group, to a new sales leader support group, a leadership group, a downline group of a sales leader in the sales leader's upline, and a downline group for a zone manager in the sales leader's upline. The user 101 may also be assigned to downline groups for the second level, such as a sales leader downline group for customers and alumni of the sales leader, a sales leader downline group for representatives the sales leader is responsible for or mentors, a sales leader downline group for other sales leaders that the sales leader is responsible for, a sales leaders downline group for representative and sales leaders in the sales leader's downline. The user 101 may also be awarded a badge or achievement award associated with the transition.

In step 630, the groups module 146 interacts with the rules engine 147 to assign other users to the new downline groups of the user 101. For example, if the user 101 transitioned from representative to sales leader, the user 101 may now have several representatives in the user's downline. The user profile may be updated (e.g., by an automated user profile process or by an administrator) to include a connection with those representatives. Similarly, the user profiles of the representatives may be updated to include a connection with the user 101. The rules engine 147 can apply the rules of the user's downline groups to the other users and populate the user's downline groups with those users that meet the membership criteria of the downline groups.

In step 640, the groups module 146 removes the user 101 from the groups associated with the first level. For example, if the user 101 transitions from representative to sales leader, the user 101 may be removed from groups for representatives. As shown in Table 1, a former representative that is now a sales leader may be removed from a representatives group, the previous downline groups for the user 101, the previous upline groups of the representative (e.g., a downline group for the sales leader in the user's previous upline and a downline group for a zone manager in the user's previous upline), and a new representative support group. The user 101 may also lose badges and awards that were achieved by the user 101 at the first level.

In step 650, the groups module 146 interacts with the rules engine 147 to reassign members of any of the user's downline groups for the first level (or any other terminated group). For example, if the user 101 transitions from a representative to an alumni or otherwise leaves the organization, then the customers of that representative may be reassigned to another representative or to a sales leader. In this example, the customers may be reassigned to someone above the user 101 in the user's upline. Alternatively, the members of any of the user's downline groups for the first level may be notified of the transition and allowed to select another user to connect with. For example, a customer may be notified of the transition of a representative to zone manager and provided with a list of representatives that may be of interest.

In step 660, the groups module 146 updates the group profiles in the group profile database 152 and interacts with the profile module 141 to update the user profile of the affected users. In step 670, the web community server 133 notifies appropriate users 101 of the changes. For example, the web community server 133 may notify the administrator or owner of each group that the user 101 is added to and removed from. The web community server 133 may also notify those users that were reassigned in step 650 and the administrators or owners of the groups the users were reassigned to. The web pages of the groups may also be updated to reflect the changes. For example, the names of new members of the affected groups may be posted in a recently joined area 745 (FIG. 7) of the group's web page.

One of ordinary skill in the art would appreciate that the present invention provides systems and methods for populating users of a web community into groups. The users may be assigned to, or otherwise associated with, one or more groups in response to an event associated with the user, with another user, with a group, or other type of event. The users may also be removed from a group in response to an event. The population of users into groups can be controlled by a configurable set of rules. These rules can include criteria for associating a user with, or removing a user from, a group in response to an event. The criteria can include criteria based on user information and criteria based on group information.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the inventions. Accordingly, such alternative embodiments are included in the invention described herein.

The exemplary embodiments can be used with computer hardware and software that performs the methods and processing functions described above. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method comprising:
monitoring, by a computer device, a web community for an event, the event related to activity of at least one user among a plurality of users of the web community and comprised of a change in a user profile of one of a plurality of users that comprises a change in status comprising a hierarchical level within a web community corresponding to downline group associations;
applying, by the computer device, a rule in response to detecting the event, said application of the rule being dependent upon a type of the detected event, said rule comprising membership criteria for a web community group and each downline group associated with the web community group, said rule applicable to a user profile for each of the plurality of users of each web community group within the web community, each user profile comprising information associated with the corresponding user;
associating, by the computer device, each user with each of the web community groups upon each user's user profile satisfying the membership criteria for each of the web community groups; and
storing, by the computer device, the associations in at least one data store; and
sending, by the computer device, a notification to each user comprising an association with the web community, the notification indicating membership in the web community group.

2. The computer-implemented method of claim 1, wherein the change in the group profile comprises a change in the membership criteria for the web community group.

3. The computer-implemented method of claim 1, further comprising:
receiving, by the computer device, the membership criteria for the web community group;
creating, by the computer device, the rule based on the membership criteria; and
storing the rule in a data store.

4. The computer-implemented method of claim 1, further comprising:
receiving, by the computer device, a modification to the membership criteria for the web community group of the rule;
modifying, by the computer device, the rule based on the modified membership criteria;
applying, by the computer device, the modified rule to the user profile for each of the plurality of users; and
associating, by the computer device, each user whose user profile meets the modified membership criteria with the web community group.

5. The computer-implemented method of claim 1, further comprising:
receiving, by the computer device, a modification to the membership criteria for the web community group of the rule;
modifying, by the computer device, the rule based on the modified membership criteria;
applying, by the computer device, the modified rule to the user profile for each user comprising an association with the web community group; and
removing, by the computer device, the association with the community web server of each user whose user profile fails to meet the modified membership criteria.

6. The computer-implemented method of claim 1, wherein the membership criteria comprises criteria configured by a user of the web community group.

7. A non-transitory computer-readable storage medium tangibly encoded with a computer program product comprising computer-executable instructions, that when executed by a computing device, perform a method-comprising:
monitoring a web community for an event, the event related to activity of at least one user among a plurality of users of the web community comprised of a change in a user profile of one of a plurality of users that comprises a change in status comprising a hierarchical level within a web community corresponding to downline group associations;

applying a rule in response to detecting the event, said application of the rule being dependent upon a type of the detected event, said rule comprising membership criteria for a web community group and each downline group associated with the web community group, said rule applicable to a user profile for each of the plurality of users of each web community group within the web community, each user profile comprising information associated with the corresponding user;

associating each user with each of the web community groups upon each user's user profile satisfying the membership criteria for each of the web community group;

storing the associations in at least one data store; and sending, by the computer device, a notification to each user comprising an association with the web community, the notification indicating membership in the web community group.

8. The non-transitory computer-readable storage medium of claim 7, wherein the event comprises at least one of an expiration of a time period, a change in the user profile of one of the plurality of users, and a change in a group profile of the web community group.

9. The non-transitory computer-readable storage medium of claim 7, wherein the change in the group profile comprises a change in the membership criteria for the web community group.

10. The non-transitory computer-readable storage medium of claim 7, further comprising:
 receiving the membership criteria;
 creating the rule based on the membership criteria; and
 storing the rule in a data store.

11. The non-transitory computer-readable storage medium of claim 7, further comprising:
 receiving a modification to the membership criteria for the web community group of the rule;
 modifying the rule based on the modified membership criteria;
 applying the modified rule to the user profile for each of the plurality of users; and
 associating each user whose user profile meets the modified membership criteria with the web community group.

12. The non-transitory computer-readable storage medium of claim 7, further comprising:
 receiving a modification to the membership criteria for the web community group of the rule;
 modifying the rule based on the modified membership criteria;
 applying the modified rule to the user profile for each user comprising an association with the web community group; and
 removing the association with the community web server of each user whose user profile fails to meet the modified membership criteria.

13. The non-transitory computer-readable storage medium of claim 7, wherein the membership criteria comprises criteria configured by a user of the web community group.

\* \* \* \* \*